(12) United States Patent
Tyler (10) Patent No.: US 11,565,617 B2
(45) Date of Patent: Jan. 31, 2023

(54) INTEGRATED RAMP TRUCK TAILGATE APPARATUS

(71) Applicant: Letrakus Tyler, Opelousas, LA (US)

(72) Inventor: Letrakus Tyler, Opelousas, LA (US)

( * ) Notice: Subject to any disclaimer, the term of this patent is extended or adjusted under 35 U.S.C. 154(b) by 57 days.

(21) Appl. No.: 17/217,410

(22) Filed: Mar. 30, 2021

(65) Prior Publication Data

US 2022/0314861 A1 Oct. 6, 2022

(51) Int. Cl.
*B60P 1/43* (2006.01)
*B62D 33/03* (2006.01)
*B62D 33/027* (2006.01)

(52) U.S. Cl.
CPC .......... *B60P 1/435* (2013.01); *B62D 33/0273* (2013.01); *B62D 33/03* (2013.01)

(58) Field of Classification Search
CPC ....... B62D 33/0273; B62D 33/03; B60P 1/52; B60P 1/435
See application file for complete search history.

(56) References Cited

U.S. PATENT DOCUMENTS

| | | | | |
|---|---|---|---|---|
| 2,958,432 A * | 11/1960 | Milhem | ................... | B60P 3/32 |
| | | | | 414/529 |
| 3,976,209 A * | 8/1976 | Burton | ................... | B60P 1/435 |
| | | | | 52/645 |
| 4,212,581 A * | 7/1980 | Pierce | ...................... | B60P 1/52 |
| | | | | 414/559 |
| 4,944,546 A * | 7/1990 | Keller | ...................... | B60P 1/435 |
| | | | | 108/130 |
| 5,244,335 A * | 9/1993 | Johns | ...................... | B60P 1/435 |
| | | | | 296/61 |
| 5,273,335 A * | 12/1993 | Belnap | ................ | B62D 33/0273 |
| | | | | 296/61 |
| 5,540,474 A * | 7/1996 | Holland | ................... | B60P 1/435 |
| | | | | 296/61 |
| 5,803,523 A * | 9/1998 | Clark | ...................... | B60P 1/435 |
| | | | | 296/61 |
| 5,907,276 A * | 5/1999 | Lance | ..................... | B60P 1/435 |
| | | | | 296/61 |
| 5,988,725 A * | 11/1999 | Cole | ................... | B62D 33/0273 |
| | | | | 296/61 |
| 6,447,040 B1 | 9/2002 | Young, Sr. | | |
| 6,634,848 B2 | 10/2003 | Henderson | | |
| 6,722,721 B2 | 4/2004 | Sherrer | | |
| 6,746,068 B1 | 6/2004 | Hurd | | |
| 6,764,123 B1 | 7/2004 | Bilyard | | |

(Continued)

*Primary Examiner* — Gregory A Blankenship (57) ABSTRACT

An integrated ramp truck tailgate apparatus for convenient loading and offloading includes a tailgate body pivotably coupled to a bed of a pickup truck. The tailgate body has a body inner face with a ramp cavity. A first ramp panel has a first proximal edge pivotably coupled to the ramp cavity adjacent a body distal edge. The first ramp panel moves between a first folded position within the ramp cavity and a first extended position extending from the body distal edge towards the ground. A second ramp panel has a second proximal edge pivotably coupled to a first distal edge of the first ramp panel. The second ramp panel moves between a second folded position on top of the first ramp panel within the ramp cavity and a second extended position extending coplanar from the first ramp panel in the first extended position to the ground.

9 Claims, 8 Drawing Sheets

(56) References Cited

U.S. PATENT DOCUMENTS

| | | | | |
|---|---|---|---|---|
| 6,991,277 | B1* | 1/2006 | Esler | B60P 3/14 |
| | | | | 296/50 |
| 7,186,069 | B2* | 3/2007 | Ehler | B60P 3/12 |
| | | | | 414/538 |
| 7,513,552 | B2* | 4/2009 | Carvalho | B60P 1/431 |
| | | | | 296/26.09 |
| 8,348,325 | B2* | 1/2013 | Hausler | B62D 33/0273 |
| | | | | 296/62 |
| 9,199,569 | B2* | 12/2015 | Justak | B65G 69/30 |
| 9,452,782 | B1* | 9/2016 | Singer | B62D 33/0273 |
| 9,738,204 | B1* | 8/2017 | Stojkovic | B60P 1/435 |
| 9,789,913 | B2* | 10/2017 | Singer | B62D 33/0273 |
| 9,925,905 | B2* | 3/2018 | Adriani | B60P 1/435 |
| 10,077,083 | B1* | 9/2018 | Survis | B62D 33/0273 |
| 10,974,656 | B2* | 4/2021 | Keck | B60R 9/065 |
| 10,994,660 | B2* | 5/2021 | Ngo | B62D 33/0273 |
| 2003/0015885 | A1* | 1/2003 | Landwehr | B62D 33/0273 |
| | | | | 296/61 |
| 2006/0033377 | A1* | 2/2006 | Frimel | B60P 1/003 |
| | | | | 298/1 A |
| 2008/0042464 | A1* | 2/2008 | Hutchins, Jr. | B60R 3/02 |
| | | | | 296/61 |
| 2008/0159838 | A1* | 7/2008 | Sherer | B60P 1/435 |
| | | | | 414/537 |
| 2015/0352998 | A1* | 12/2015 | Hindy | B60P 1/52 |
| | | | | 410/52 |
| 2018/0022174 | A1* | 1/2018 | Stojkovic | B60D 1/185 |
| | | | | 414/506 |
| 2019/0084466 | A1* | 3/2019 | Marchlewski | B60P 1/6409 |
| 2019/0283649 | A1* | 9/2019 | Delaurier | B60P 3/07 |
| 2020/0361363 | A1* | 11/2020 | Maners | B60P 7/0807 |
| 2021/0162908 | A1* | 6/2021 | Drummond | B65G 69/287 |
| 2021/0253039 | A1* | 8/2021 | Cappuccio | B60R 9/065 |
| 2022/0194288 | A1* | 6/2022 | Allicock | A01M 31/006 |

* cited by examiner

INTEGRATED RAMP TRUCK TAILGATE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

The Names of the Parties to a Joint Research Agreement

Not Applicable

Incorporation-by-Reference of Material Submitted on a Compact Disc OAS a Text File Via the Office Electronic Filing System Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to truck tailgate devices and more particularly pertains to a new truck tailgate device for convenient loading and offloading. The new device includes a tailgate with an integrated folding ramp. There may be an electric winch for assisted loading and unloading.

(2) Description of Related Art Including Information Disclosed Under 37 CFR 1.97 and 1.98

The prior art relates to truck tailgate devices. Existing devices include folding tailgates that unfold to form a ramp. Such devices typically comprise panels of equal width that can create a ramp rather than a ramp that folds to be stored within a tailgate. These devices are thus unwieldy when attempting to open the tailgate for standard use without unfolding the ramp.

BRIEF SUMMARY OF THE INVENTION

An embodiment of the disclosure meets the needs presented above by generally comprising a tailgate body having a body proximal edge configured to be pivotably coupled to a bed of a pickup truck. The tailgate body has a body inner face and a body outer face. The body inner face has a ramp cavity extending through a body distal edge. The tailgate body moves between a vertical closed position and a perpendicular open position. The tailgate body in the vertical closed position is configured to cover a bed opening aperture of the bed of the pickup truck. A first ramp panel is coupled to the tailgate body. The first ramp panel has a first proximal edge pivotably coupled to the ramp cavity adjacent the body distal edge. The first ramp panel moves between a first folded position within the ramp cavity and a first extended position extending from the body distal edge towards the ground. A second ramp panel is coupled to the first ramp panel. The second ramp panel has a second proximal edge pivotably coupled to a first distal edge of the first ramp panel. The second ramp panel moves between a second folded position on top of the first ramp panel within the ramp cavity and a second extended position extending coplanar from the first ramp panel in the first extended position to the ground.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
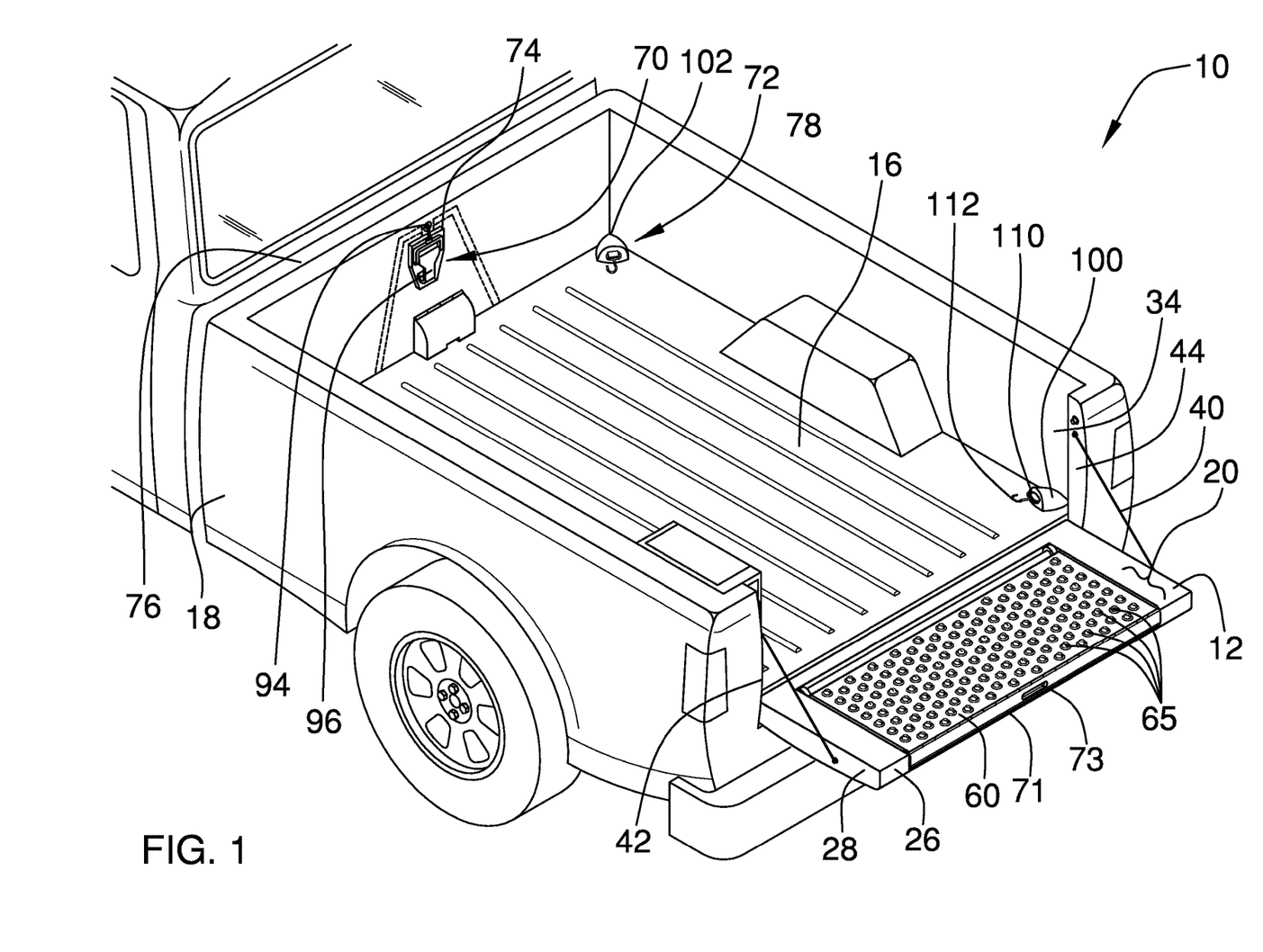
FIG. 1 is an isometric view of an integrated ramp truck tailgate apparatus according to an embodiment of the disclosure.
Figure 2:
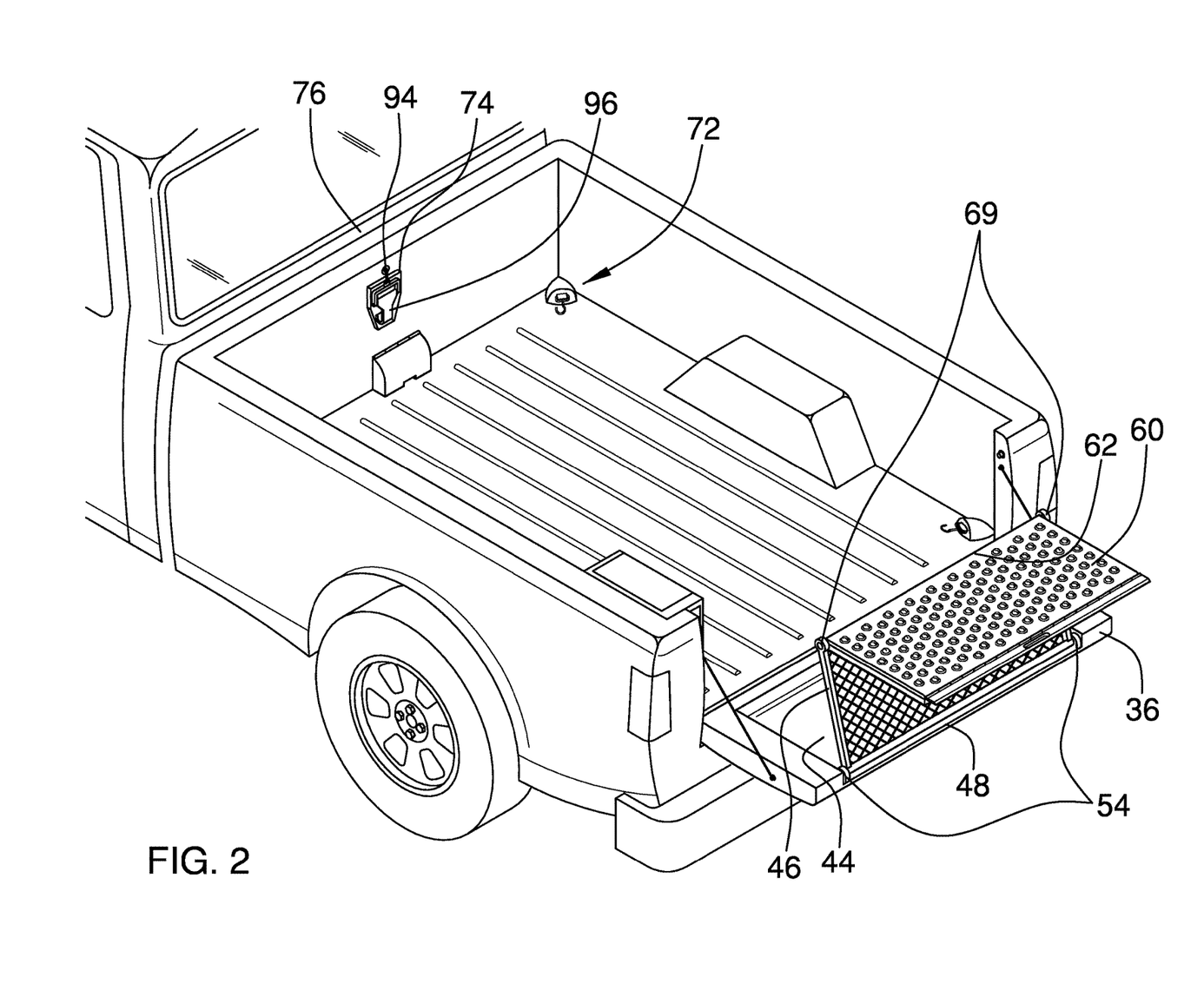
FIG. 2 is an isometric view of an embodiment of the disclosure.
Figure 3:
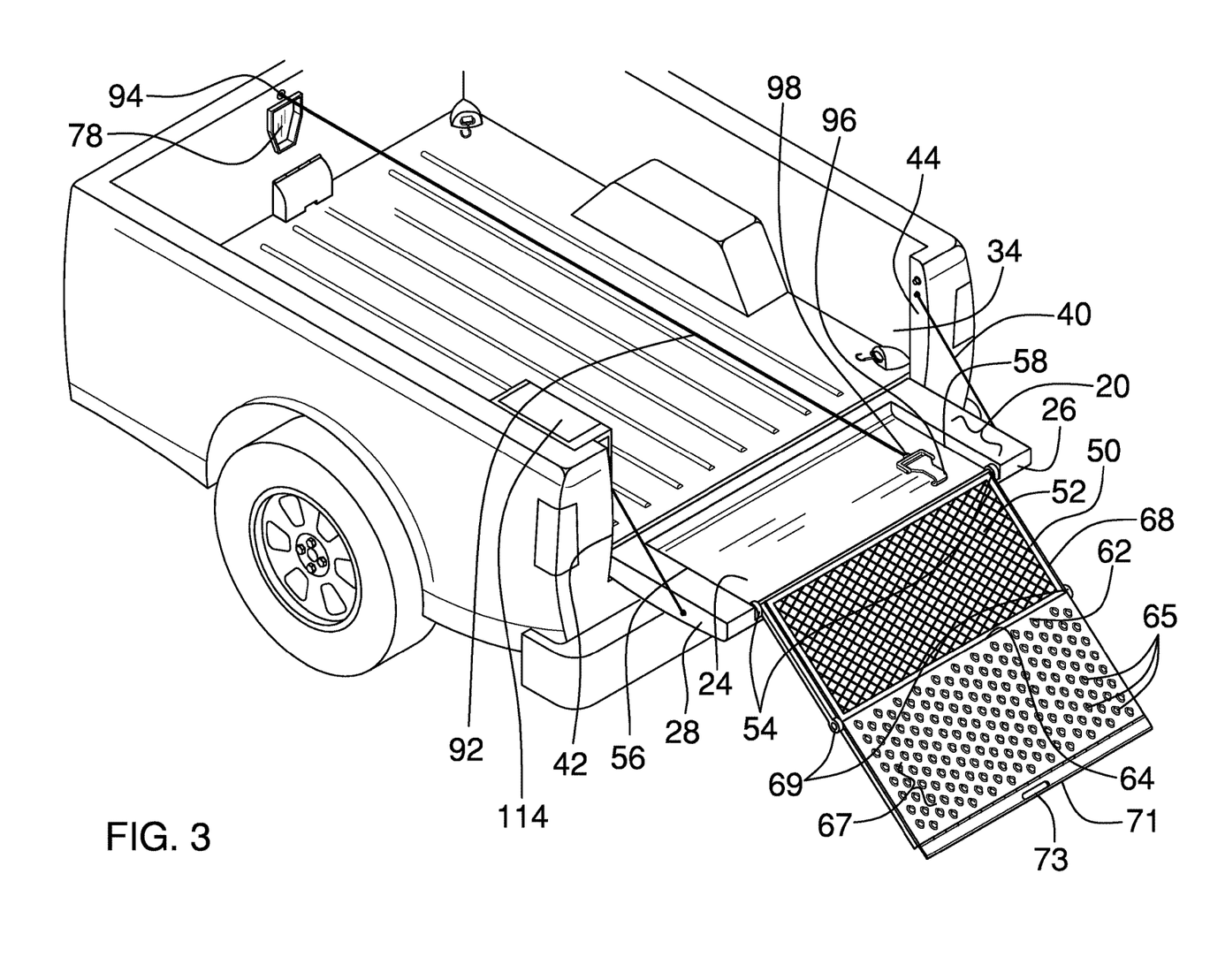
FIG. 3 is an isometric view of an embodiment of the disclosure.
Figure 4:
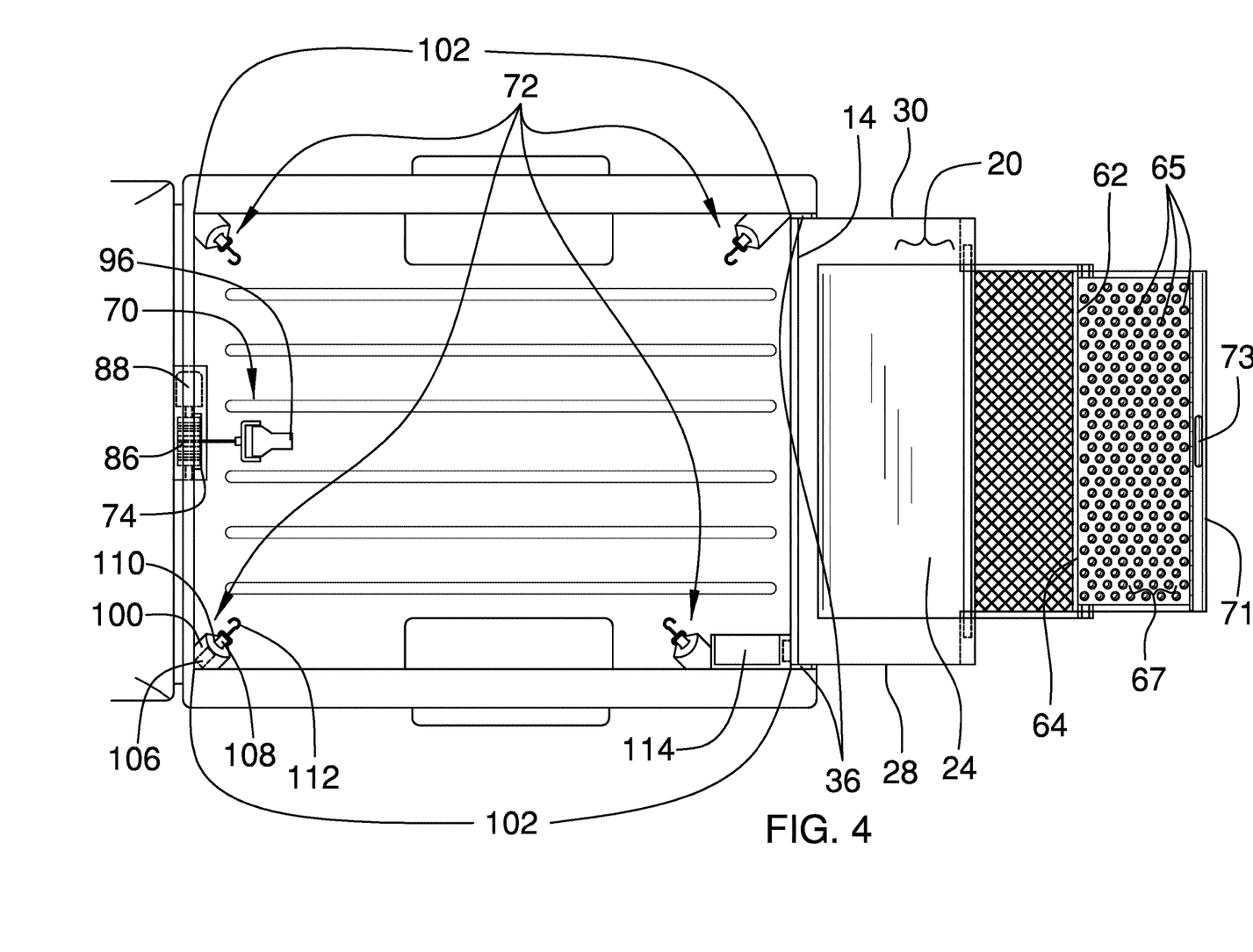
FIG. 4 is a top plan view of an embodiment of the disclosure.
Figure 5:
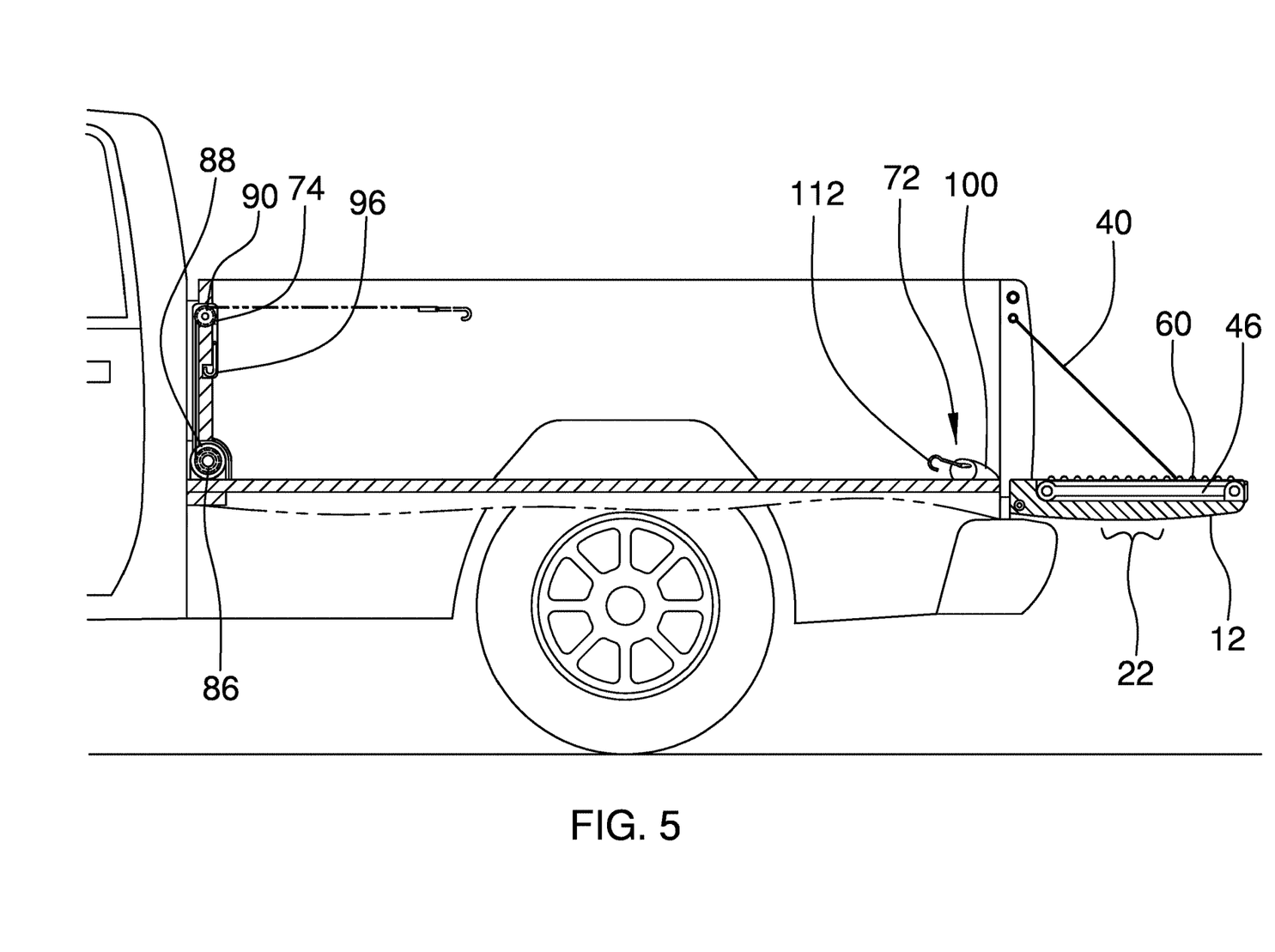
FIG. 5 is a side elevation view of an embodiment of the disclosure.
Figure 6:
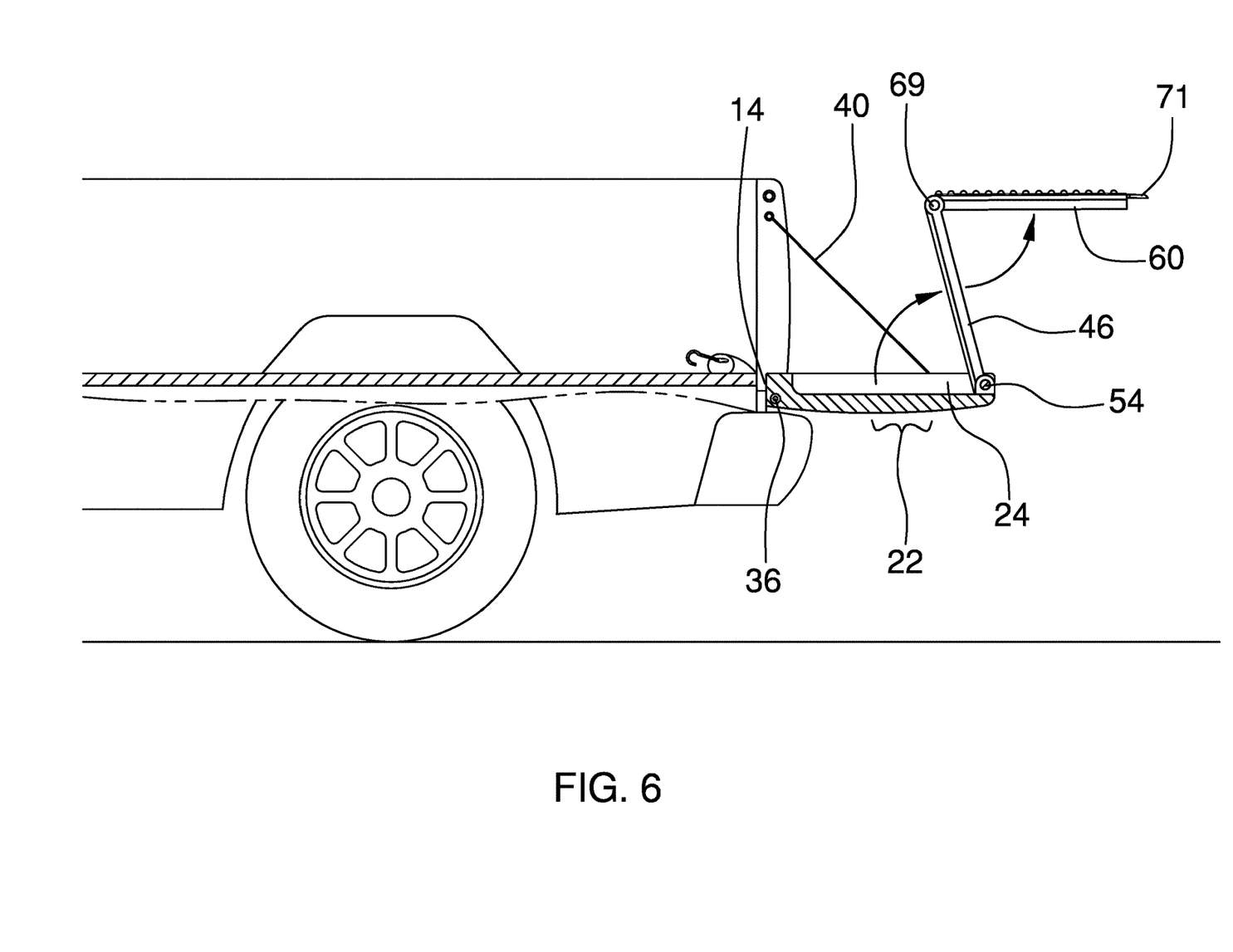
FIG. 6 is a side elevation view of an embodiment of the disclosure.
Figure 7:
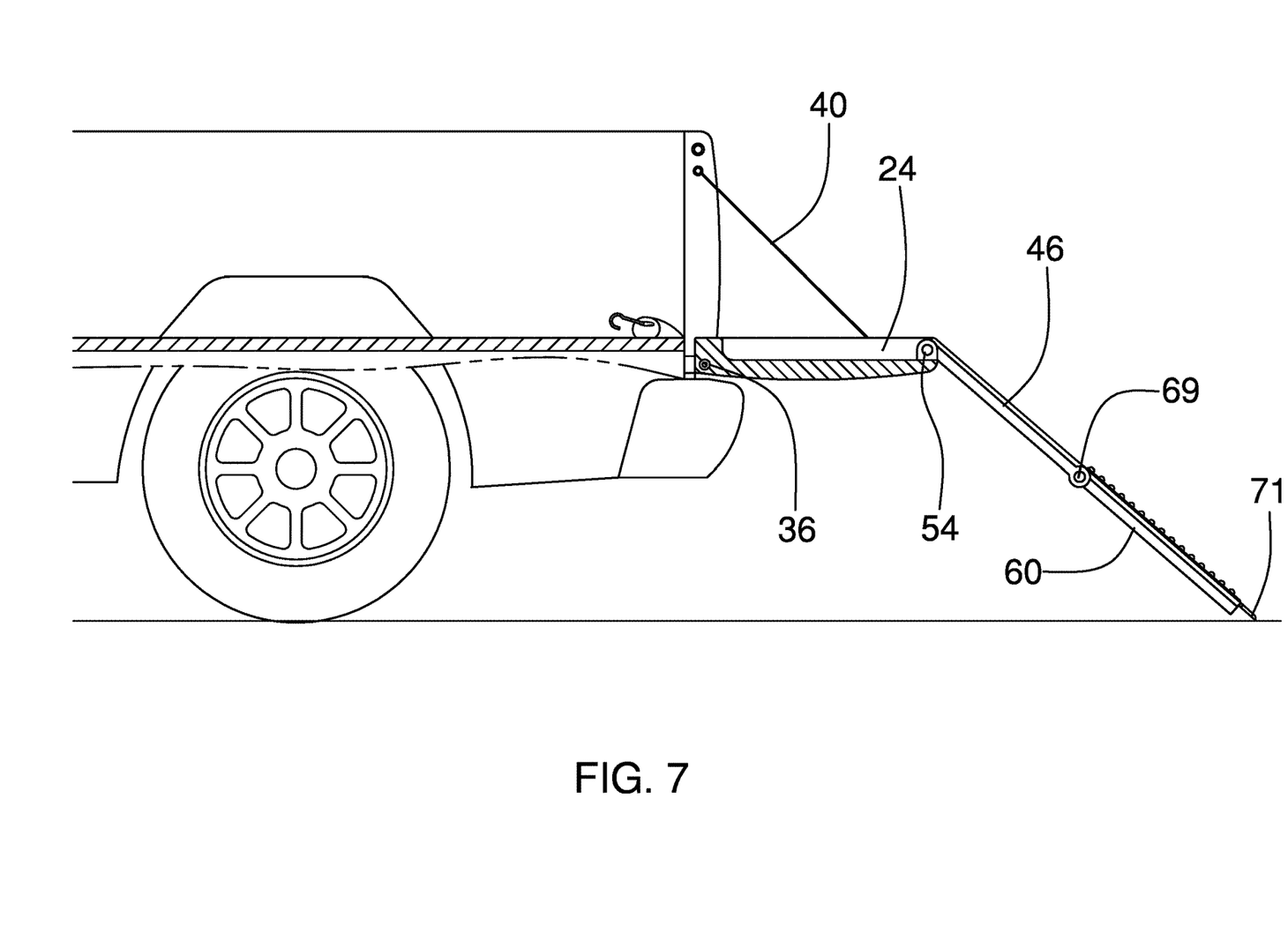
FIG. 7 is a side elevation view of an embodiment of the disclosure.
Figures 8, 9:
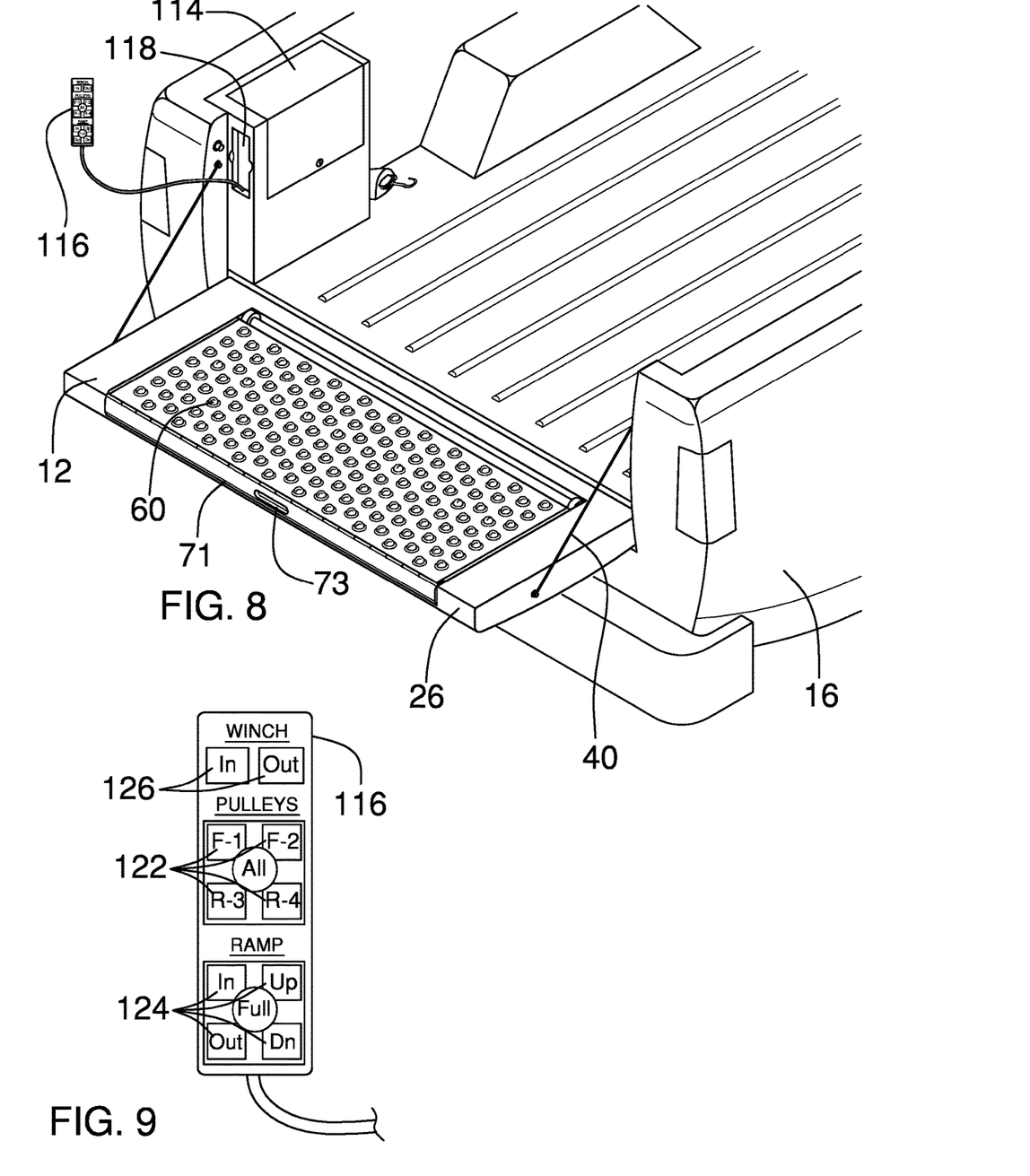
FIG. 8 is an isometric view of an embodiment of the disclosure.
FIG. 9 is a detail view of an embodiment of the disclosure.

With reference now to the drawings, and in particular to FIGS. 1 through 9 thereof, a new truck tailgate device embodying the principles and concepts of an embodiment of the disclosure and generally designated by the reference numeral 10 will be described.

As best illustrated in FIGS. 1 through 9, the integrated ramp truck tailgate apparatus 10 generally comprises a tailgate body 12 having a body proximal edge 14 configured to be pivotably coupled to a bed 16 of a pickup truck 18. The tailgate body 12 has a body inner face 20 and a body outer face 22. The body inner face 20 has a ramp cavity 24 extending through a body distal edge 26. The ramp cavity 24 does not extend fully to a body left edge 28 or a body right edge 30 of the tailgate body. The body outer face 22 has the appearance of a standard truck tailgate. The tailgate body 12 moves between a vertical closed position and a perpendicular open position. The tailgate body 12 in the vertical closed position is configured to cover a bed opening aperture 34 of the bed of the pickup truck.

The tailgate body 12 may have a pair of motorized tailgate pivots 36 coupled to the body left edge 28 and the body right edge 30 to automatically move between the vertical closed position and the perpendicular open position. The pair of motorized tailgate pivots 36 is configured to be in operational communication with a truck electrical system 38 of the pickup truck 18. A pair of tailgate support cables 40 is coupled to the body left edge 28 and the body right edge 30 of the tailgate body. The pair of tailgate support cables 40 is configured to extend to an opening left edge 42 and an opening right edge 44 of the bed opening aperture. The pair of tailgate support cables 40 maintains the tailgate body 12 horizontal when in the perpendicular open position.

A first ramp panel 46 is coupled to the tailgate body 12. The first ramp panel 46 has a first proximal edge 48 pivotably coupled to the ramp cavity 24 adjacent the body distal edge 26. The first ramp panel 46 moves between a first folded position within the ramp cavity (shown in FIGS. 1 and 5) and a first extended position extending from the body distal edge 26 towards the ground (shown in FIGS. 3 and 7). The first ramp panel 46 may have a frame portion 50 and a mesh portion 52 coupled within the frame portion 50 in order to reduce overall weight while maintaining structural integrity. The first ramp panel 46 may have a pair of first motorized ramp pivots 54 coupled to a cavity left edge 56 and a cavity right edge 58 of the ramp cavity 24 to automatically move between the first folded position and the first extended position. The pair of first motorized ramp pivots 54 is configured to be in operational communication with the truck electrical system 38 of the truck.

A second ramp panel 60 is coupled to the first ramp panel 46. The second ramp panel 60 has a second proximal edge 62 pivotably coupled to a first distal edge 64 of the first ramp panel. The second ramp panel 60 moves between a second folded position on top of the first ramp panel 46 (shown in FIGS. 1 and 5) within the ramp cavity 24 and a second extended position extending coplanar from the first ramp panel 46 in the first extended position to the ground (shown in FIGS. 3 and 7). The first ramp panel 46 and the second ramp panel 60 in the first extended position and the second extended position, respectively, form an angle with the ground between 30° and 50°.

The second ramp panel 60 may have a plurality of cargo rollers 65 rotatingly coupled to a second outer face 67. Each of the plurality of cargo rollers 65 may be a roller ball 65 but may alternatively be a rolling pipe section oriented in parallel with the second proximal edge 62. The plurality of cargo rollers 65 allow for an object to more easily slide across the second ramp panel 60 during loading and unloading. The first ramp panel 46 and the second ramp panel 60 in the first folded position and the second folded position, respectively, fully occupy the ramp cavity 24 of the tailgate body with the second outer face 64 lying coplanar with the body inner face 20 of the tailgate body. The second ramp panel 60 may have a pair of second motorized ramp pivots 69 coupled to a first left edge 66 and a first right edge 68 of the first ramp panel 46 to automatically move between the second folded position and the second extended position. The pair of second motorized ramp pivots 69 is configured to be in operational communication with the truck electrical system 38 of the truck. The second ramp panel 60 may have a second distal edge 71 with an integrated handle 73. The second distal edge 71 may be pivotably attached to the second ramp panel 60.

The integrated ramp truck tailgate apparatus 10 may be part of a system including an electric winch 70 and a plurality of retractable cargo straps 72. The electric winch 70 includes a winch housing 74 configured to be coupled to the bed 16 of the pickup truck proximal a cab 76 of the pickup truck. The winch housing 74 may be coupled within the bed 16 and may include a hook recession 78 extending through the bed 16. A winch drive 86 is coupled within the winch housing 74. The winch drive 86 includes a winch motor 88 and a geared drum 90 in operational communication with the winch motor 88. The winch motor 88 is configured to be in operational communication with the truck electrical system 38 of the pickup truck. A winch cable 92 is coupled to the geared drum 90. The winch cable 92 is windingly engaged around the geared drum 90 and extends through a cable aperture 94 of the winch housing. The cable aperture 94 may extend through the vertical upper portion 80 in order to accommodate a winch hook 96 coupled to the winch cable 92 against the angled medial portion 82. The winch hook 96 is coupled to a cable distal end 98 of the winch cable and is configured to selectively engage an item being loaded into the bed 16 of the pickup truck to allow the winch drive 86 to pull the item up the first ramp panel 46 and the second ramp panel 60.

Each of the plurality of retractable cargo straps 72 comprises a strap housing 100 configured to be coupled to a bed corner 102 of the bed of the pickup truck. A strap drive 104 is coupled within the strap housing 102. The strap drive 104 includes a strap motor 106 configured to be in operational communication with the truck electrical system 38 of the pickup truck. A strap 108 is coupled to the strap drive 104 and extends through a strap aperture 110 of the strap housing. A strap hook 112 is coupled to the strap 108 to secure items in the bed 16 of the pickup truck.

A control box 114 may be coupled to the bed 16 of the pickup truck. A remote 116 may extend from a remote aperture 118 of the control box. The remote 116 is in operational communication with the electric winch 70, the pair of first motorized ramp pivots 54, the pair of second motorized ramp pivots 69, and the plurality of retractable cargo straps 72. The remote 116 may include a pair of winch control buttons 120, a plurality of strap control buttons 122, and a plurality of ramp control buttons 124.

In use, the tailgate body 12 is moved to the perpendicular open position and the first ramp panel 46 and the second ramp panel 60 are moved to the first extended position and the second extended position, respectively. The electric winch 70 is then used to assist in sliding an item up the first ramp panel 46 and the second ramp panel 60 into the bed 16 of the pickup truck. The plurality of retractable cargo straps 72 may then be used to secure the item in place.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An integrated ramp truck tailgate apparatus comprising:
a tailgate body, the tailgate body having a body proximal edge configured to be pivotably coupled to a bed of a pickup truck, the tailgate body having a body inner face and a body outer face, the body inner face having a ramp cavity extending through a body distal edge, the tailgate body moving between a vertical closed position and a perpendicular open position, the tailgate body in the vertical closed position being configured to cover a bed opening aperture of the bed of the pickup truck;
a first ramp panel coupled to the tailgate body, the first ramp panel having a first proximal edge pivotably coupled to the ramp cavity adjacent the body distal edge, the first ramp panel moving between a first folded position within the ramp cavity and a first extended position extending from the body distal edge towards the ground;
a second ramp panel coupled to the first ramp panel, the second ramp panel having a second proximal edge pivotably coupled to a first distal edge of the first ramp panel, the second ramp panel moving between a second folded position on top of the first ramp panel within the ramp cavity and a second extended position extending coplanar from the first ramp panel in the first extended position to the ground; and
an electric winch comprising:
a winch housing, the winch housing being configured to be coupled to the bed of the pickup truck proximal a cab of the pickup truck;
a winch drive coupled within the winch housing, the winch drive including a winch motor and a geared drum in operational communication with the winch motor, the winch motor being configured to be in operational communication with a truck electrical system of the pickup truck;
a winch cable coupled to the geared drum, the winch cable being windingly engaged around the geared drum and extending through a cable aperture of the winch housing; and
a winch hook coupled to the winch cable, the winch hook being coupled to a cable distal end of the winch cable and being configured to selectively engage an item being loaded into the bed of the pickup truck to allow the winch drive to pull the item up the first ramp panel and the second ramp panel, the winch housing having a housing front side, the housing front side having a vertical upper portion, an angled medial portion, and a vertical lower portion, the cable aperture extending through the vertical upper portion.

2. The integrated ramp truck tailgate apparatus of claim 1 further comprising a pair of tailgate support cables coupled to the tailgate body, the pair of tailgate support cables being coupled to a body left edge and a body right edge of the tailgate body and being configured to extend to an opening left edge and an opening right edge of the bed opening aperture, the pair of tailgate support cables maintaining the tailgate body horizontally when in the perpendicular open position.

3. The integrated ramp truck tailgate apparatus of claim 1 further comprising the first ramp panel and the second ramp panel in the first extended position and the second extended position, respectively, forming an angle with the ground between 30° and 50°.

4. The integrated ramp truck tailgate apparatus of claim 1 further comprising the first ramp panel having a frame portion and a mesh portion coupled within the frame portion.

5. The integrated ramp truck tailgate apparatus of claim 1 further comprising the second ramp panel having a plurality of cargo rollers rotatingly coupled to a second outer face.

6. The integrated ramp truck tailgate apparatus of claim 5 further comprising each of the plurality of cargo rollers being a roller ball.

7. The integrated ramp truck tailgate apparatus of claim 1 further comprising the first ramp panel and the second ramp panel in the first folded position and the second folded position, respectively, fully occupying the ramp cavity of the tailgate body with a second outer face of the second ramp panel lying coplanar with the body inner face of the tailgate body.

8. An integrated ramp truck tailgate apparatus and loading system comprising:
an integrated ramp truck tailgate apparatus comprising:
a tailgate body, the tailgate body having a body proximal edge configured to be pivotably coupled to a bed of a pickup truck, the tailgate body having a body inner face and a body outer face, the body inner face having a ramp cavity extending through a body distal edge, the tailgate body moving between a vertical closed position and a perpendicular open position, the tailgate body in the vertical closed position being configured to cover a bed opening aperture of the bed of the pickup truck;
a pair of tailgate support cables coupled to the tailgate body, the pair of tailgate support cables being coupled to a body left edge and a body right edge of the tailgate body and being configured to extend to an opening left edge and an opening right edge of the bed opening aperture, the pair of tailgate support cables maintaining the tailgate body horizontally when in the perpendicular open position;
a first ramp panel coupled to the tailgate body, the first ramp panel having a first proximal edge pivotal coupled to the ramp cavity adjacent the body distal edge, the first ramp panel moving between a first folded position within the ramp cavity and a first extended position extending from the body distal edge towards the ground, the first ramp panel having a frame portion and a mesh portion coupled within the frame portion; and
a second ramp panel coupled to the first ramp panel, the second ramp panel having a second proximal edge pivotably coupled to a first distal edge of the first ramp panel, the second ramp panel moving between a second folded position on top of the first ramp panel within the ramp cavity and a second extended position extending coplanar from the first ramp panel in the first extended position to the ground, the first ramp panel and the second ramp panel in the first extended position and the second extended position, respectively, forming an angle with the ground between 30° and 50°, the second ramp panel having a plurality of cargo rollers rotatingly coupled to a second outer face, each of the plurality of cargo rollers being a roller ball, the first ramp panel and the second ramp panel in the first folded position and the second folded position, respectively, fully occupying the ramp cavity of the tailgate body with the second outer face lying coplanar with the body inner face of the tailgate body; and an electric winch comprising:
a winch housing, the winch housing being configured to be coupled to the bed of the pickup truck proximal a cab of the pickup truck;
a winch drive coupled within the winch housing, the winch drive including a winch motor and a geared drum in operational communication with the winch motor, the winch motor being configured to be in operational communication with a truck electrical system of the pickup truck;
a winch cable coupled to the geared drum, the winch cable being windingly engaged around the geared drum and extending through a cable aperture of the winch housing; and
a winch hook coupled to the winch cable, the winch hook being coupled to a cable distal end of the winch cable and being configured to selectively engage an item being loaded into the bed of the pickup truck to allow the winch drive to pull the item up the first ramp panel and the second ramp panel, the winch housing having a housing front side, the housing front side having a vertical upper portion, an angled medial portion, and a vertical lower portion, the cable aperture extending through the vertical upper portion.

9. An integrated ramp truck tailgate apparatus and loading system comprising:
an integrated ramp truck tailgate apparatus comprising:
a tailgate body, the tailgate body having a body proximal edge configured to be pivotally coupled to a bed of a pickup truck, the tailgate body having a body inner face and a body outer face, the body inner face having a ramp cavity extending through a body distal edge, the tailgate body moving between a vertical closed position and a perpendicular open position, the tailgate body in the vertical closed position being configured to cover a bed opening aperture of the bed of the pickup truck;
a pair of tailgate support cables coupled to the tailgate body, the pair of tailgate support cables being coupled to a body left edge and a body right edge of the tailgate body and being configured to extend to an opening left edge and an opening right edge of the bed opening aperture, the pair of tailgate support cables maintaining the tailgate body horizontally when in the perpendicular open position;
a first ramp panel coupled to the tailgate body, the first ramp panel having a first proximal edge pivotal coupled to the ramp cavity adjacent the body distal edge, the first ramp panel moving between a first folded position within the ramp cavity and a first extended position extending from the body distal edge towards the ground, the first ramp panel having a frame portion and a mesh portion coupled within the frame portion; and
a second ramp panel coupled to the first ramp panel, the second ramp panel having a second proximal edge pivotably coupled to a first distal edge of the first ramp panel, the second ramp panel moving between a second folded position on top of the first ramp panel within the ramp cavity and a second extended position extending coplanar from the first ramp panel in the first extended position to the ground, the first ramp panel and the second ramp panel in the first extended position and the second extended position, respectively, forming an angle with the ground between 30° and 50°, the second ramp panel having a plurality of cargo rollers rotatingly coupled to a second outer face, each of the plurality of cargo rollers being a roller ball, the first ramp panel and the second ramp panel in the first folded position and the second folded position, respectively, fully occupying the ramp cavity of the tailgate body with the second outer face lying coplanar with the body inner face of the tailgate body; and an electric winch comprising:
a winch housing, the winch housing being configured to be coupled to the bed of the pickup truck proximal a cab of the pickup truck;
a winch drive coupled within the winch housing, the winch drive including a winch motor and a geared drum in operational communication with the winch motor, the winch motor being configured to be in operational communication with a truck electrical system of the pickup truck;
a winch cable coupled to the geared drum, the winch cable being windingly engaged around the geared drum and extending through a cable aperture of the winch housing; and
a winch hook coupled to the winch cable, the winch hook being coupled to a cable distal end of the winch cable and being configured to selectively engage an item being loaded into the bed of the pickup truck to allow the winch drive to pull the item up the first ramp panel and the second ramp panel; and a plurality of retractable cargo straps, each retractable cargo strap comprising
a strap housing, the strap housing configured to be coupled to a bed corner of the bed of the pickup truck;
a strap drive coupled within the strap housing, the strap drive including a strap motor configured to be in operational communication with the truck electrical system of the pickup truck;
a strap coupled to the strap drive, the strap extending through a strap aperture of the strap housing; and
a strap hook coupled to the strap.

* * * * *